US010932077B2

(12) United States Patent
Goldberg et al.

(10) Patent No.: US 10,932,077 B2
(45) Date of Patent: Feb. 23, 2021

(54) METHOD AND DEVICE FOR AUTOMATIC CONFIGURATION OF AN AUDIO OUTPUT SYSTEM

(71) Applicant: Sennheiser electronic GmbH & Co. KG, Wedemark (DE)

(72) Inventors: Andrew Peter Goldberg, Espoo (FI); Markus Wolff, Wedemark (DE); Werner Pfeffer, Munich (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 0 days.

(21) Appl. No.: 16/545,143

(22) Filed: Aug. 20, 2019

(65) Prior Publication Data

US 2020/0068332 A1 Feb. 27, 2020

(30) Foreign Application Priority Data

Aug. 27, 2018 (DE) .......................... 102018120804.9

(51) Int. Cl.
*H04S 7/00* (2006.01)
*H04L 12/24* (2006.01)
*H04R 5/02* (2006.01)
*H04R 5/04* (2006.01)
*G06F 3/16* (2006.01)
(Continued)

(52) U.S. Cl.
CPC ............ *H04S 7/301* (2013.01); *G06F 3/0484* (2013.01); *G06F 3/165* (2013.01); *H04L 41/0886* (2013.01); *H04R 5/02* (2013.01); *H04R 5/04* (2013.01); *H04S 3/008* (2013.01); *H04S 7/303* (2013.01); *H04S 7/305* (2013.01); *H04S 2400/01* (2013.01); *H04S 2400/11* (2013.01)

(58) Field of Classification Search
None
See application file for complete search history.

(56) References Cited

U.S. PATENT DOCUMENTS

2011/0135124 A1\* 6/2011 Steffens .................... H04R 5/02
381/300
2016/0253145 A1\* 9/2016 Lee .......................... H04W 4/06
381/79

FOREIGN PATENT DOCUMENTS

EP 2 996 354 3/2016

\* cited by examiner

*Primary Examiner* — Kenny H Truong
(74) *Attorney, Agent, or Firm* — Haug Partners LLP

(57) ABSTRACT

Audio reproduction systems include a plurality of loudspeakers that are actuated in accordance with a multi-channel audio format. The loudspeakers can be configurable by way of a network interface The loudspeakers are registered on the network. A method for automatic configuration of an audio reproduction system includes automatically determining that all loudspeakers are connected to the network, determining the number of loudspeakers which are disposed in the same room and which are part of the loudspeaker arrangement, automatically generating a representation of a virtual loudspeaker arrangement on a display according to the determined number, and sequentially, for each loudspeaker belonging to the loudspeaker arrangement, as an actual loudspeaker, generating a signal by the actual loudspeaker, receiving a user input characterizing a virtual loudspeaker, assigning the position of the characterized virtual loudspeaker to the actual loudspeakers and configuring audio signal processing for the actual loudspeaker according to its assigned position.

17 Claims, 4 Drawing Sheets

(51) Int. Cl.
*G06F 3/0484* (2013.01)
*H04S 3/00* (2006.01)

METHOD AND DEVICE FOR AUTOMATIC CONFIGURATION OF AN AUDIO OUTPUT SYSTEM

The present application claims priority from German Patent Application No. 10 2018 120 804.9 filed on Aug. 27, 2018, the disclosure of which is incorporated herein by reference in its entirety.

FIELD OF THE INVENTION

The invention concerns a method for automatic configuration of an audio reproduction system and a device for automatic configuration of an audio reproduction system.

BACKGROUND

Audio reproduction systems normally include a plurality of loudspeaker boxes or loudspeakers disposed in a room. Hereinafter the terms "loudspeaker box" and "loudspeaker" are used synonymously unless otherwise specified. The loudspeakers are actuated by the respective channels of a multi-channel audio system. In that case, depending on the respective multi-channel audio system, given positions in the room and relative to a listening position are prescribed, at which the loudspeakers are to be positioned in order to achieve optimum audio reproduction at the listening position. For example, for the stereo format, two loudspeakers are to be positioned which are respectively disposed at an angle of 30° to the left and the right in front of the listening position. For the surround format or 5.1 format five loudspeakers and a subwoofer are to be positioned in accordance with the following pattern: one loudspeaker centrally in front of the listening position, two loudspeakers at an angle of 30° to the left and the right in front of the listening position and two further loudspeakers at an angle of 110° to the left and right behind the listening position. The position of the subwoofer is not critical here because the hearing of the listener cannot or can scarcely locate the low frequencies reproduced thereby. The distances relative to the listening position should be the same for all loudspeakers, and likewise all loudspeakers (except for the subwoofer) should be at the height of the ears of the listener. There are numerous further possible multi-channel audio systems or corresponding arrangements of loudspeakers, for example for four or seven or even more channels. The loudspeaker arrangement is also referred to as the setup. The positions of the loudspeakers are prescribed because the corresponding audio channels which are contained in the respective multi-channel audio system are assigned thereto. If a loudspeaker is positioned other than is prescribed the corresponding audio signal is reproduced from the wrong position so that the reproduction sound field is no longer true to the original. That concerns both the azimuth angle (plane angle) and also the elevation angle (height angle) and the distance of the loudspeaker relative to the listening position. In such cases it may be possible to correct the audio signals for the loudspeaker in accordance with its position, for example by filtering and/or delay elements in order to adapt the audio signals to the position. That however is very laborious because the position of each loudspeaker has to be accurately measured off and the corresponding correction has to be determined.

In some situations, for example in studio buildings, larger audio reproduction systems are used, which include setups or loudspeaker arrangements in a plurality of rooms. It is then advantageous if each loudspeaker can be configured from a central location by way of a network in order to implement the above-described adaptation operation.

EP 2 996 354 B1 describes an apparatus for loudspeaker control, which on a graphical user interface displays a spatial representation of loudspeaker elements. Each element is associated with a physical loudspeaker connected to a network. Each of the displayed elements can be moved by the user on the graphical user interface to the position of the corresponding physical loudspeaker, in which case that physical loudspeaker emits a sensor signal during the movement of the associated element. The position of the element on the graphical user interface is determined and a name is thereupon assigned to the element and the associated loudspeaker. That name is influenced both by the position and also by the loudspeaker type, that the apparatus receives directly from the loudspeaker by way of the network. That known solution however assumes that all loudspeakers are in the same room as the apparatus. As graphical elements for all loudspeakers are displayed the known apparatus is not suitable for configuring those loudspeaker arrangements in which not all loudspeakers are disposed in the same room.

SUMMARY OF THE INVENTION

An object of the present invention is to provide an alternative device for automatic and easily implementable configuration of an audio reproduction system, which can be used irrespective of whether all loudspeakers connected to the network are disposed in the same room. Configuration also includes localization of loudspeakers which are connected to the network and the physical position of which is initially not known. In particular the aim is also to be able to configure such audio reproduction systems which include a plurality of loudspeaker arrangements in different rooms. A further object of the present invention is to provide a corresponding method for automatic and easily implementable configuration of an audio output system.

A method according to the invention concerns the automatic configuration of an audio reproduction system for a loudspeaker arrangement comprising a plurality of loudspeakers by means of a configuration unit, wherein the loudspeaker arrangement and the configuration unit are disposed in the same room and are connected to a network and configuration is effected by the network. The method includes the steps: automatically determining all loudspeakers connected to the network, determining the number of loudspeakers which are disposed in the room and are part of the loudspeaker arrangement, and automatically generating a representation of a virtual loudspeaker arrangement on a display screen of the configuration unit according to the determined number, wherein each virtual loudspeaker of the display representation has a position. In that case the following steps are performed sequentially for each loudspeaker belonging to the loudspeaker arrangement, as an actual loudspeaker: generating an acoustic and/or optical signal by the respective actual loudspeaker, receiving a user input defining that virtual loudspeaker that is disposed at the position of the respective actual loudspeaker, assigning the position of the virtual loudspeaker to the actual loudspeaker, and configuring an audio signal processing for the actual loudspeaker according to its assigned position.

In a corresponding device for automatic configuration of an audio reproduction system for a loudspeaker arrangement comprising a plurality of loudspeakers by means of a configuration unit, the configuration unit includes a module with a network interface for automatically determining all loudspeakers connected to the network, a module having a detector for determining the number of loudspeakers which are disposed in the room and belong to the loudspeaker arrangement, and for determining a virtual loudspeaker arrangement according to the determined number, wherein each virtual loudspeaker of the virtual loudspeaker arrangement has a position, a display generating module for automatically generating a representation of the virtual loudspeaker arrangement on a graphical display of the configuration unit, and a configuration module. The configuration module sequentially cause each loudspeaker belonging to the loudspeaker arrangement as a virtual loudspeaker to generate an acoustic and/or optical signal, receives a user input which defines that virtual loudspeaker on the graphical display which is at the position of the respective actual loudspeaker, assigns the position of the virtual loudspeaker to the actual loudspeaker, and assigns to the actual loudspeaker audio signal processing corresponding to its assigned position.

With the method according to the invention and the corresponding device the individual loudspeakers of a loudspeaker arrangement can be very easily identified or located and configured, in particular in regard to calibration of the frequency response, volume and lag.

Further advantageous configurations are described in the appendant claims.

BRIEF DESCRIPTION OF THE DRAWINGS

Further details and advantageous configurations are shown in the drawings in which:

FIG. 8 shows two pages of the user interface for the input of first data, and FIG. 9 shows two pages of a user interface for the input of second data.

DETAILED DESCRIPTION OF THE INVENTION

Figure 1:
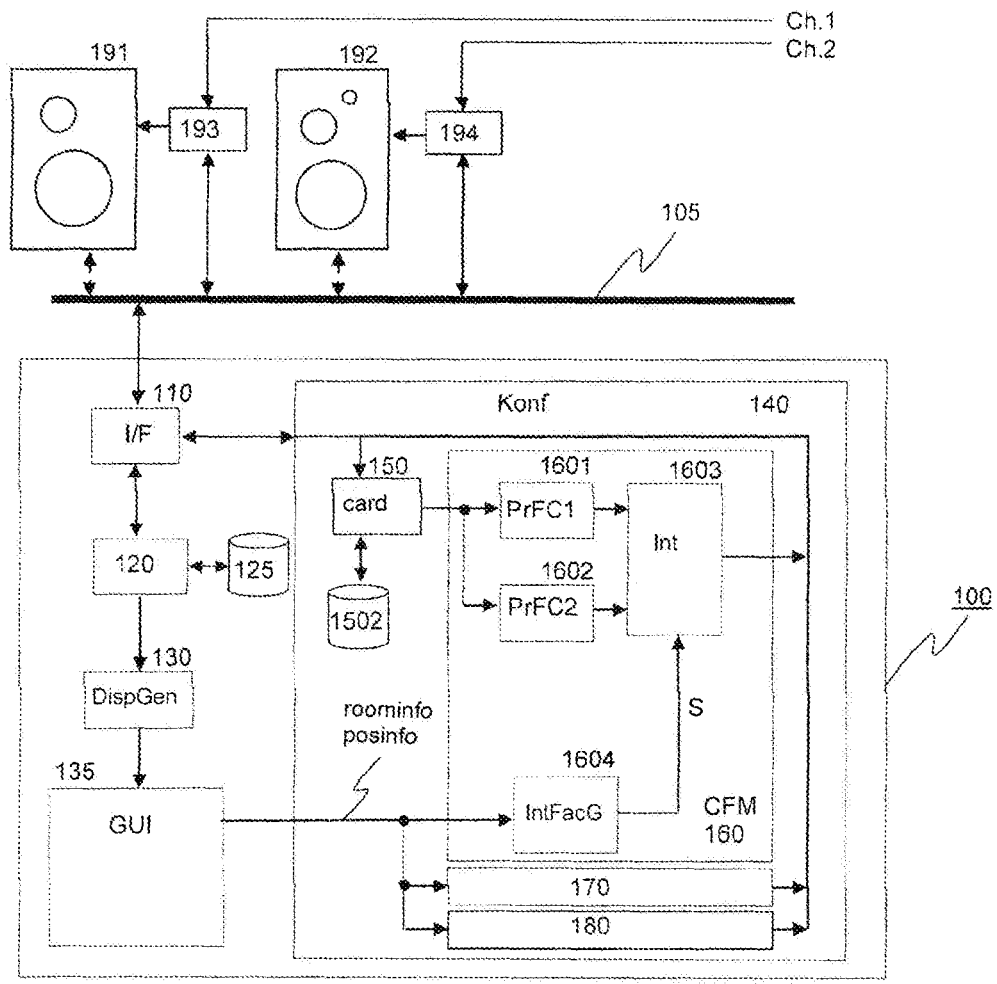
FIG. 1 shows a block circuit diagram of a device according to the invention.

FIG. 1 shows a block circuit diagram of a device according to the invention for automatic configuration of an audio reproduction system for a loudspeaker arrangement comprising a plurality of loudspeakers 191, 192 by means of a configuration unit 100, wherein the loudspeakers belonging to the loudspeaker arrangement as well as the configuration unit 100 are disposed in the same room and are connected to a network 105. Further loudspeakers which do not belong to the loudspeaker arrangement in the same or in a different room can also be connected to the network 105 (this is not shown). Configuration is effected through the network 105. the configuration unit 100 of the device includes a network interface module 110 which can automatically detect all loudspeakers connected to the network and a detection module 120 for determining the number of loudspeakers which are disposed in the room and which belong to the loudspeaker arrangement, and for determining a loudspeaker arrangement in accordance with that determined number. For that purpose typical loudspeaker arrangements for a different number of loudspeakers can be stored in a memory 120.

In addition the configuration unit 100 includes a display generating module 130 for automatically generating a representation of the determined virtual loudspeaker arrangement on a graphical display 135 of the configuration unit. The display generating module 130 receives data relating to the number of loudspeakers and the possible arrangement thereof from the detection module 120. The loudspeaker arrangement represented on the graphical display 135 and the individual loudspeakers thereof are identified as "virtual", in contrast to the physically present loudspeakers. The number of loudspeakers belonging to the loudspeaker arrangement is initially not established. In relation to different possible sizes of the loudspeaker arrangement, that is to say the number of loudspeakers involved therein, it is possible to predetermine at least one pre-defined virtual loudspeaker arrangement and store it in a memory 125 of the detection module 120. In that case each virtual loudspeaker of the virtual loudspeaker arrangement has a given position. If for example the determined number of loudspeakers is six then a virtual 5.1 or surround configuration can be automatically displayed. In that case the individual virtual loudspeakers are identified according to the positions pre-defined for that configuration, for example "front left", "rear left" and so forth. In an embodiment the display presents a 3D view of the configuration.

The configuration unit 100 also includes a configuration module 140 which sequentially for the loudspeakers connected directly or indirectly to the network and thus at least for each loudspeaker which belongs to the loudspeaker arrangement, performs the following: firstly it causes the respective actual (physical) loudspeaker 191, 192 to generate or reproduce an acoustic and/or optical signal. For that purpose for example the loudspeaker can be actuated by way of the network 105 or an audio source (not shown) controlled by the configuration module 140 can pass a signal to the loudspeaker by way of the respective audio channel Ch1, Ch2. The user then selects by means of the graphical display 135 of the configuration unit, that virtual loudspeaker disposed at the position of the respective actual physical loudspeaker 191, 192. If for example the loudspeaker which the configuration module 140 causes to reproduce a signal is the rear left loudspeaker of a surround arrangement the user selects the virtual rear left loudspeaker on the graphical display 135. The configuration module 140 receives the user input and assigns the position of the virtual loudspeaker to the actual loudspeaker 191, 192. The graphical display 135 can be in the form of a touchscreen in one embodiment, while in another embodiment it can be in the form of a display with a cursor.

Configuration is then effected by the configuration module 140 assigning to the actual loudspeaker 191, 192 an audio signal processing process corresponding to its assigned position.

In an embodiment the configuration unit 100 includes a user interface 135 for receiving user input data. They can contain first user input data which include the number of loudspeakers which are disposed in the room and which belong to the loudspeaker arrangement, and/or second user input data which represent a selection from a plurality of possibilities of loudspeaker arrangements with the determined number of loudspeakers disposed in the room. For example for a determined number of six loudspeakers, a different arrangement from 5.1 or surround sound can be possible, for example a uniform distribution on a circle. In that case the user can select which of the possible arrangements is involved.

In an embodiment the receiving module 110 is suitable for receiving information data from the loudspeaker 191, 192 concerning the loudspeaker type. For example one of the loudspeakers 191 can be a 2-way box of Neumann KH80 type, and another 192 can be an indirectly connected 3-way box of Neumann KH420 type. In that case the configuration module 140 includes an assignment module 150 for assigning characteristic information of the loudspeaker according to the loudspeaker type. The assignment module 150 can access a memory 1502 to retrieve those data. The characteristic information can be for example frequency responses or power responses.

In an embodiment the configuration module 140 includes a filter adapter module 160 for calculating a correction filter curve, a level determining module 170 for determining a level and a delay determining module 180 for determining a delay for the loudspeaker. The filter adaptor module 160 serves for calculating a correction filter curve for the loudspeaker from geometrical parameters of the room, from information about the loudspeaker position in the room and from parameters concerning the direct environment of the loudspeaker. Those values can be input by the user for example by way of the graphical user interface (GUI) 135. The calculated correction filter curve can be output by the network interface module 110 to a correction filter 193, 194 for the loudspeaker. The correction filter 193, 194 can be integrated in the respective loudspeaker or a device connected thereto or can be a separate component. If the calculated correction filter curve is applied to the loudspeaker it calibrates same. Details in that respect are described hereinafter.

In an embodiment the filter adapter module 160 includes two filter curve calculation units: the first filter curve calculation unit 1601 is suitable for calculating a first provisional correction filter curve which compensates for reverberativeness of the room. The second filter curve calculation unit 1602 is suitable for calculating a second provisional correction filter curve which compensates for an acoustic interaction (boundary effects) of the loudspeaker with its direct environment. Both are calculated from the characteristic information data of the loudspeaker and the parameters concerning the acoustic nature of the direct environment of the loudspeaker. Furthermore in this embodiment the filter adaptor module 160 includes an interpolation factor calculation unit 1604 for determining an environment-specific interpolation factor S from the information about the position of the loudspeaker relative to the listening position, and an interpolation module 1603. The interpolation module 1603 is suitable for generating the filter correction curve by interpolation between the first and the second provisional correction filter curves using the determined interpolation factor. In that respect the influence of the second provisional correction filter curve is correspondingly greater than the first, the closer the listening position to the loudspeaker. That is described in greater detail hereinafter with reference to FIGS. 5 through 7.

Figure 2:
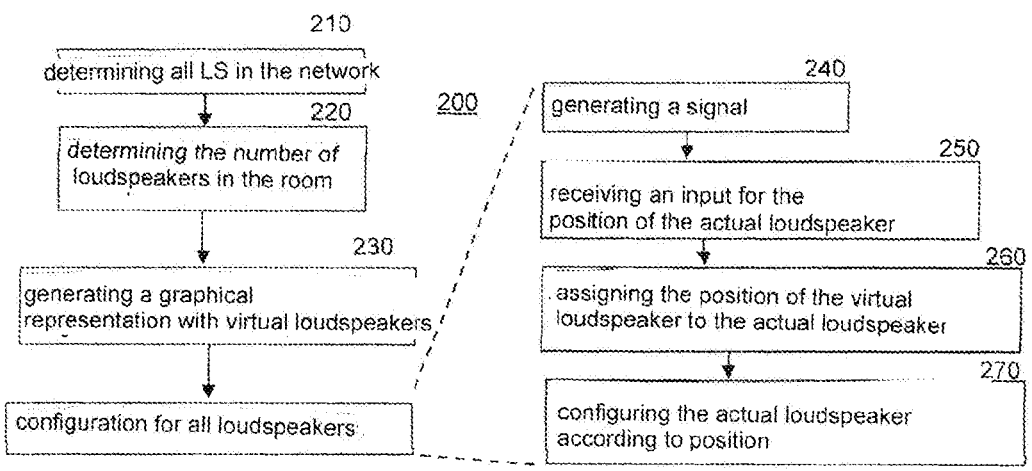
FIG. 2 shows a flow chart of a method according to the invention.

FIG. 2 shows a flow chart of a method 200 for automatic configuration of an audio reproduction system for a loudspeaker arrangement comprising a plurality of loudspeakers 191, 192 by means of a configuration unit 100, wherein the loudspeaker arrangement and the configuration unit are disposed in the same room and are connected to a network 105 and configuration is effected through the network. The method comprises the steps: automatically determining 210 all loudspeakers connected to the network, determining 220 the number of loudspeakers which are disposed in the room and which belong to the loudspeaker arrangement, and automatically generating 230 a representation of a virtual loudspeaker arrangement on a display screen of the configuration unit according to the determined number, wherein each virtual loudspeaker of the display representation has a position corresponding to the loudspeaker arrangement. The following steps are then carried out sequentially for each loudspeaker which belongs to the loudspeaker arrangement as an actual loudspeaker: an acoustic and/or optical signal is generated by the respective actual loudspeaker 240, a user input is received 250, which characterizes that virtual loudspeaker disposed at the position of the respective actual loudspeaker, and the position of the virtual loudspeaker is assigned to the actual loudspeaker 260. Finally the audio signal processing for actual loudspeaker is configured according to its assigned position 270. Prior to that configuration step 270 however the correction filter curve must be known. Therefore the configuration 270 of the loudspeakers can also take place in a separate adjoining loop about all loudspeakers belonging to the loudspeaker arrangement. The correction filter curves can be determined between the two loops.

In an embodiment the step 220 of determining the number of loudspeakers which are disposed in the room and belong to the loudspeaker arrangement is effected by receiving user input data.

In an embodiment user input data are received, representing a selection from a plurality of possibilities of loudspeaker arrangements with the determined number of loudspeakers disposed in the room, wherein the representation of a virtual loudspeaker arrangement is effected on a display screen according to the determined number and the user input data.

In an embodiment connected to the network is at least one further loudspeaker which is not disposed in the room, wherein generation of an acoustic and/or optical signal is also effected by the at least one loudspeaker which is not in the room. In that case a user input for the at least one loudspeaker not in the room defines that it is not disposed in the room.

In an embodiment each virtual loudspeaker of the display representation, in addition to the position, has a name which displays the position and which is assigned to the actual loudspeaker. In an embodiment the configuration step 270 of audio signal processing for the actual loudspeaker corresponding to its assigned position includes the following further steps: receiving loudspeaker type information data from the loudspeaker by way of the network, receiving characteristic information data of the loudspeaker according to the loudspeaker type, for example by means of the assignment module 150 and the memory 1502, then calculating a correction filter for the loudspeaker from geometrical parameters of the room, from information about the position of the loudspeaker in the room, from parameters concerning the direct environment of the loudspeaker and from the characteristic information data of the loudspeaker, and application of the calculated correction filter to the loudspeaker, whereby the loudspeaker is calibrated.

In particular in an embodiment calculation of the correction filter includes the following steps: on the basis of the parameters of the acoustic nature of the room a reverberativeness of the room is determined, and a first provisional correction filter curve which compensates for the reverberativeness of the room is determined from the reverberativeness. A second provisional correction filter curve which compensates for an acoustic interaction (boundary effects) of the loudspeaker with its direct environment is determined from the characteristic information data of the loudspeaker and the parameters concerning the acoustic nature of the direct environment of the loudspeaker. Finally the correction filter curve is obtained by interpolation between the first and second provisional correction filter curves, utilizing the determined interpolation factor, wherein the influence of the second provisional correction filter curve is correspondingly greater, the closer the listening position to the loudspeaker.

In an embodiment the method includes the further steps: receiving first user input data which include the parameters of the acoustic nature of the room, receiving second user input data which include the parameters concerning the acoustic nature of the direct environment of the loudspeaker, and receiving third user input data which include information about the position of the loudspeaker in the room relative to the listening position.

In an embodiment the method includes the following steps: determining a level in a level determining module 170 and determining a delay in a delay determining module 180, wherein both are determined from the parameters of the acoustic nature of the room, the information about the position of the loudspeaker in the room relative to the listening position, and the parameters concerning the acoustic nature of the direct environment of the loudspeaker. The determined level and delay values are output by way of the network to a level adaptation unit and a delay adaptation unit for the respective loudspeaker.

In an embodiment the parameters concerning the acoustic nature of the room include an estimated classification in respect of reverberativeness, wherein the classification has not more than ten steps. In an embodiment the parameters concerning the acoustic nature of the direct environment of the loudspeaker include information about sound-reflecting surfaces within a radius of about 1 meter around the loudspeaker.

In an embodiment the invention concerns a storage medium with instructions stored thereon, which, when executed by a computer, cause the computer to carry out the above-described method or at least parts thereof.

Figure 3:
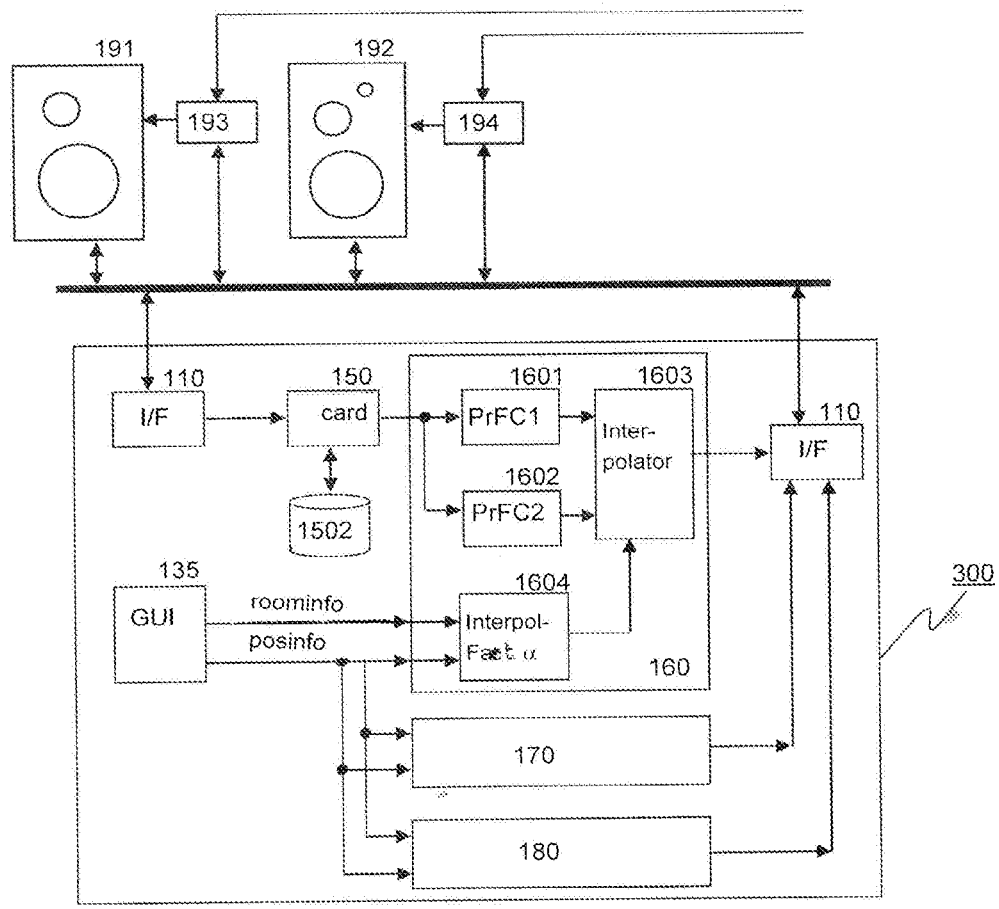
FIG. 3 shows a block circuit diagram of a device according to the invention in an embodiment.

FIG. 3 shows a block circuit diagram of a device 300 for the configuration of a loudspeaker 191, 192 in an embodiment of the invention. This embodiment serves for the configuration of individual loudspeakers and can be used when it is known that all loudspeakers 191, 192 of the loudspeaker arrangement are in the same room. The device 300 includes a network interface module 110 which can automatically set up a connection to at least one loudspeaker connected to the network 105 and can receive information data from the loudspeaker 191, 192 concerning the loudspeaker type. In that situation the device 300 includes an assignment module 150 for assigning characteristic information of the loudspeaker according to the loudspeaker type. The assignment module 150 can access a memory 1502 to retrieve those data. In addition the device 300 includes a filter adapter module 160 for calculating a correction filter curve, a level determining module 170 for determining a level and a delay determining module 180 for determining a delay for the loudspeaker, as described above. The values necessary for that can be received for example by way of the graphical user interface (GUI) 135 by the user. The calculated correction filter curve can be output by the network interface module 110 to a correction filter 193, 194 for the loudspeaker.

Figure 4:
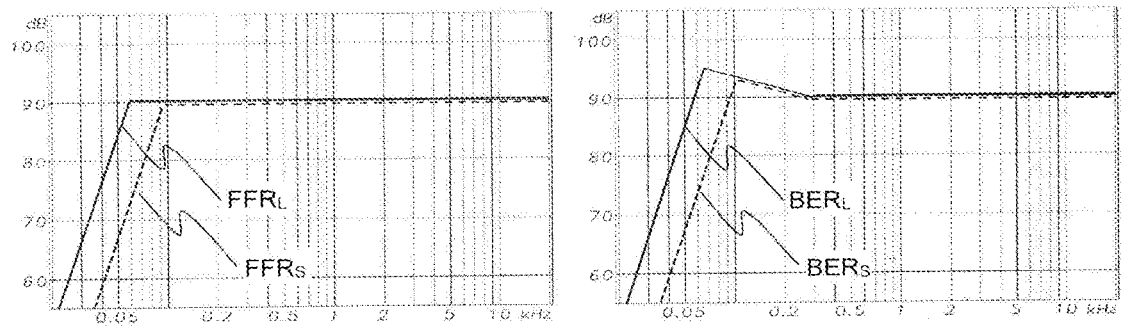
FIG. 4 shows free field responses of various loudspeakers and the impact of the boundary effect on the responses of the loudspeakers.
Figure 5:
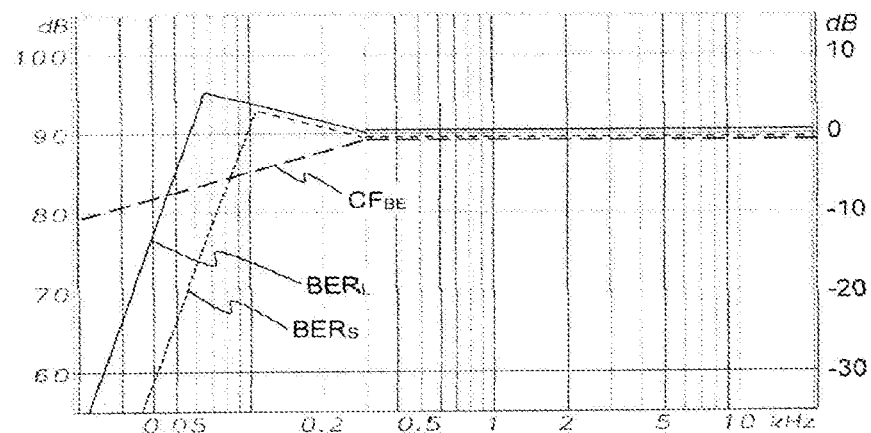
FIG. 5 shows a correction filter curve for boundary effects.

FIG. 4 in the left-hand graph shows free field responses of various loudspeakers. In that case the free field response $FFR_S$ of a smaller loudspeaker is substantially linear above a frequency of about 100 Hz while the free field response $FFR_L$ of a larger speaker is already linear above a frequency of about 60 Hz. The right-hand graph shows the impact of the acoustic interaction of the loudspeaker with its direct environment (the so-called boundary effect) on the responses of the loudspeakers. In that case an excessive increase up to 5 dB for low frequencies up to about 300 Hz occurs as a "boundary effect response" BER. That increase in this example can be up to 5 dB for larger loudspeakers and 3 dB for smaller loudspeakers. In order to compensate for same a compensation filter for boundary effects is calculated with a correction filter curve $CF_{BE}$ as shown in FIG. 5. The scale shown at the right-hand edge of the graph applies for the correction filter curve $CF_{BE}$.

Figure 6:
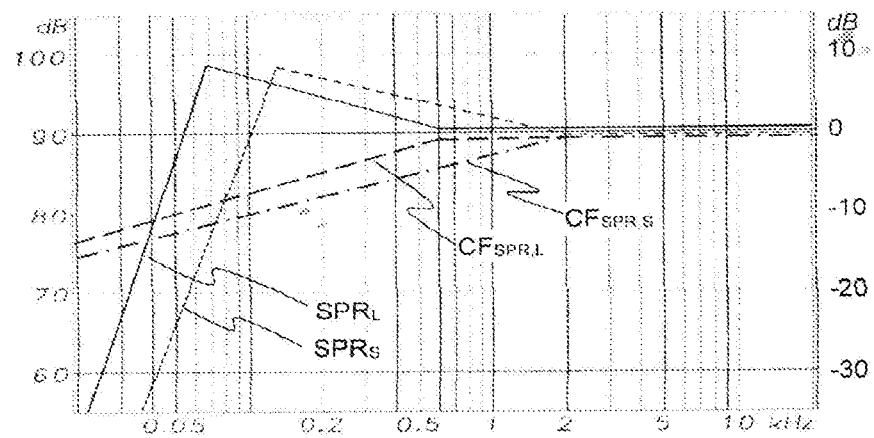
FIG. 6 shows power responses of various loudspeakers and the correction filter curves thereof.

Another correction filter curve applies for the reverberativeness of the room, in which the loudspeakers are disposed. That is dependent on the loudspeaker type. FIG. 6 represents the reverberativeness as a signal power response SPR. In that respect, for a smaller loudspeaker there is a power response $SPR_S$ which shows an increase up to 8 dB below about 2 Hz with a maximum at about 150 Hz. The power response $SPR_I$ for a larger loudspeaker has an increase up to 8 dB in contrast below about 600 Hz with a maximum at about 70 Hz. The corresponding correction filters for smaller loudspeakers therefore have different filter curves $CF_{SPR,S}$ from those for larger loudspeakers $CF_{SPR,L}$, wherein the scale shown at the right-hand edge of the graph again applies for the correction filters. FIGS. 4 through 6 show simplified examples: it is however possible to record more accurate measurement curves in order to determine the corresponding correction filter curves therefrom by inversion.

Figure 7:
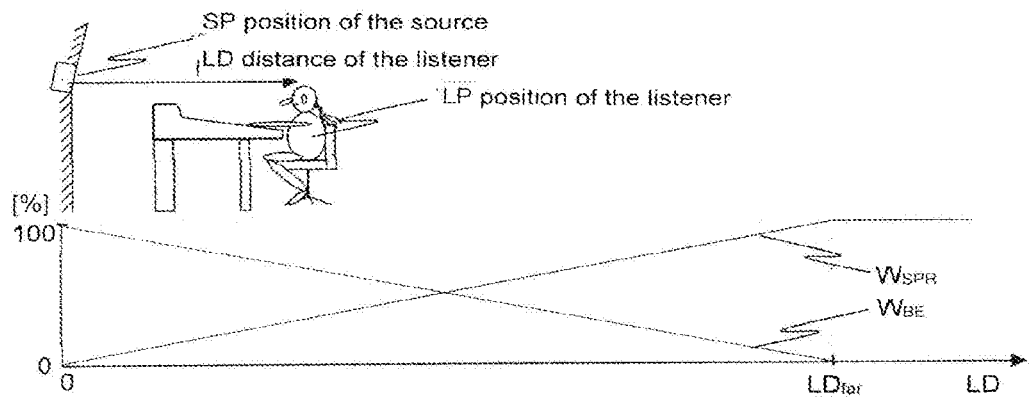
FIG. 7 shows the principle of interpolation or crossfading.

In an embodiment of the invention the respective two correction filter curves are determined as provisional correction filter curves and interpolation therebetween is carried out in order to compensate for both effects. In that case for a smaller loudspeaker interpolation is effected between the correction filter curve for its power response $CF_{SPR,S}$ and the correction filter curve $CF_{BE}$ which compensates for an acoustic interaction (boundary effects) of the smaller loudspeaker with its direct environment. Correspondingly, for a larger loudspeaker, interpolation is effected between the correction filter curve for its power response $CF_{SPR,L}$ and the correction filter curve $CF_{BE}$, which compensates for an acoustic interaction (boundary effects) of the larger loudspeaker with its direct environment. The interpolation factor is environment-specific and is determined on the information about the position of the loudspeaker relative to the listening position. In that respect the impact or the weighting $W_{BE}$ of the correction of the boundary effect is correspondingly greater, the closer the listening position to the loudspeaker, that is to say the shorter the listening distance. The weighting $W_{SPR}$ of the correction of the signal power response is correspondingly less. Interpolation or crossfading can be effected linearly, as indicated in FIG. 7, or non-linearly. It is also possible to implement interpolation only as far as a maximum listening distance $LD_{far}$ or only for a listening distance range between a minimum listening distance and a maximum distance $LD_{far}$. For greater listening distances the acoustic interaction of the loudspeaker with its direct environment is disregarded. For very short listening distances in contrast the power response of the loudspeaker can be disregarded.

Figures 8, 9:
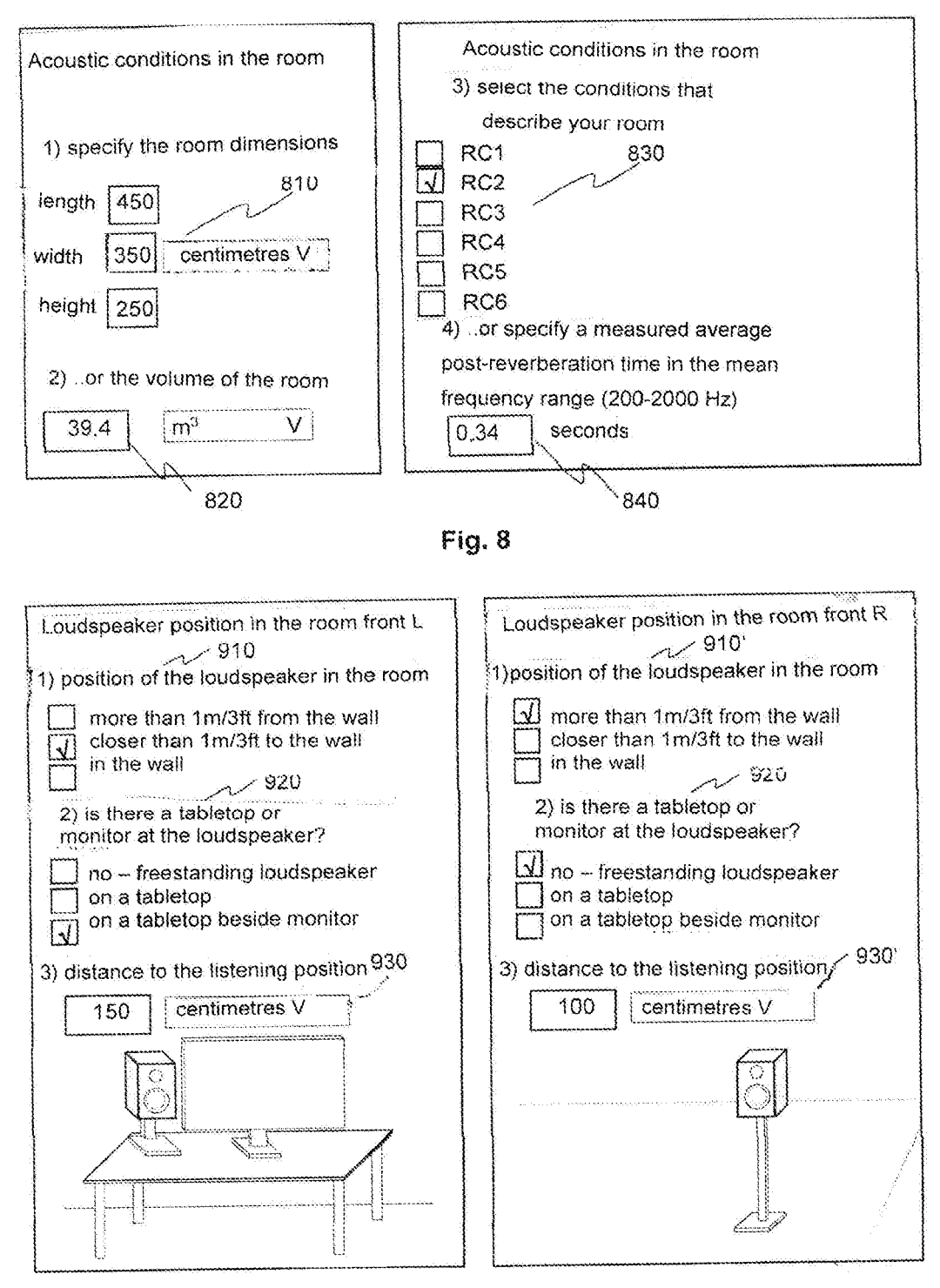

FIG. 8 shows by way of example two pages of a user interface for the input of first data, from which the reverberativeness of the room is estimated. The user can here input room dimensions 810 or a room volume 820 on a first page. On a second page the user can select an estimated classification of the room 830 or can specify a measured average post-reverberation time of the room 840. The classification includes few (a maximum of ten) categories. In this example there are six categories RC1-RC6, for example:

TABLE 1

| Categories for estimated classification of the room. | |
| --- | --- |
| RC1 | Reverberative room with hard surfaces; little furniture; without acoustic treatment |
| RC2 | Room without carpet; only little furniture with hard surfaces |
| RC3 | Room with furniture and thin carpets/curtains; without acoustic treatment |
| RC4 | Room with furniture and thick carpets/curtains; simple acoustic treatment |
| RC5 | Room with good acoustic treatment |
| RC6 | Open room without reverberation |

FIG. 9 shows by way of example a user interface for the input of second data which contain parameters concerning the acoustic nature of the direct environment of the loudspeaker and from which an acoustic interaction (boundary effects) of the loudspeaker with its direct environment is estimated. Those parameters here include on the first page a 3-stage classification 910, 910' of the distance of the loudspeaker from the nearest wall, an also 3-stage classification 920, 920' of the reflectivity of the direct environment of the loudspeaker and a distance relative to the listening position 930, 930'. The user interface for the input of second data has here only one page and is illustrated for two different examples. In the example shown on the left which relates to a loudspeaker positioned at front left it is less than 1 meter away from the wall on a tabletop beside a monitor, at a distance of 150 cm from the listening position. In the example shown on the right, describing a loudspeaker positioned at front right, it is more than 1 meter away from the wall, free-standing in the room, at a distance of 100 cm from the listening position. In an embodiment as shown in FIG. 9 a graphic representation corresponding to the selected parameters can be generated automatically.

It is self-evident that the specified embodiments by way of example can be combined insofar as is appropriate, even if such combinations are not expressly mentioned.

The invention can advantageously be used for the automatic configuration of an audio reproduction system.

The invention claimed is:

1. A method for automatic configuration of an audio reproduction system, by a computer, for a loudspeaker arrangement that comprises a plurality of loudspeakers, wherein the loudspeaker arrangement and the computer are located in a room and are connected to a network, and wherein the method for automatic configuration is carried out via the network, wherein the loudspeaker arrangement and the computer are located in the same room, the method comprising:
 automatically determining all loudspeakers connected to the network;
 determining the number of loudspeakers that are located in the room and that are part of the loudspeaker arrangement;
 automatically generating a representation of a virtual loudspeaker arrangement on a display of the computer according to the determined number, wherein each virtual loudspeaker of the representation has an associated position; and
 sequentially for each loudspeaker belonging to the loudspeaker arrangement being a current loudspeaker, performing the following steps:
 generating an acoustic and/or optical signal by the respective current loudspeaker;
 receiving a user input defining the virtual loudspeaker that is located at the position of the respective current loudspeaker;
 assigning the position of the virtual loudspeaker to the current loudspeaker; and
 configuring an audio signal processing for the current loudspeaker according to its associated position,
 wherein the configuring of an audio signal processing for the current loudspeaker comprises:
 receiving loudspeaker type information data from the current loudspeaker via the network;
 receiving characteristic information data of the current loudspeaker according to the received loudspeaker type information data;
 calculating a correction filter for the current loudspeaker using information about the loudspeaker position within the room and the characteristic information data of the current loudspeaker; and
 applying the calculated correction filter to the current loudspeaker, whereby the current loudspeaker is calibrated;
 and wherein the step of calculating a correction filter comprises:
 determining a first preliminary correction filter curve that compensates a reverberativeness of the room;
 determining a second preliminary correction filter curve that compensates boundary effects, wherein boundary effects are an acoustic interaction of the current loudspeaker with its direct environment;
 determining an environment-specific interpolation factor from information about the position of the current loudspeaker; and
 obtaining the correction filter curve by interpolation between the first preliminary correction filter curve and the second preliminary correction filter curve, using the determined interpolation factor, wherein an impact of the second preliminary correction filter curve increases as a listening position relative to the current loudspeaker decreases.

2. A method as set forth in claim 1, wherein the determining the number of loudspeakers that are located in the room and that are part of the loudspeaker arrangement is performed by receiving user input data.

3. A method as set forth in claim 1, further comprising:
 receiving user input data that represent a selection among a plurality of possible loudspeaker arrangements that have the determined number of loudspeakers located in the room,
 wherein the representation of a virtual loudspeaker arrangement on a display is made according to the determined number and the user input data.

4. A method as set forth in claim 1, wherein at least one further loudspeaker that is not located in the room is connected to the network, and wherein the generating an acoustic and/or optical signal is performed also by the at least one loudspeaker that is not located in the room, and wherein a user input for the at least one loudspeaker that is not located in the room defines that it is not in the room.

5. A method as set forth in claim 1, wherein each virtual loudspeaker of the display representation has a name in addition to the position, the name indicating the position and being assigned to the current loudspeaker.

6. A method as set forth in claim 1, wherein in the step of calculating correction filter further comprises calculating geometric parameters of the room and parameters concerning a direct environment of the current loudspeaker.

7. A method as set forth in claim 6, wherein the step of calculating a correction filter comprises:
   determining the reverberativeness of the room by using the geometric parameters of the room;
   determining, from the characteristic information data of the current loudspeaker and the parameters concerning the direct environment of the current loudspeaker, the second preliminary correction filter curve; and
   determining the environment-specific interpolation factor from the information about the position of the current loudspeaker relative to the listening position.

8. A method as set forth in claim 7, further comprising:
   receiving first user input data that comprise parameters defining an acoustic nature of the room;
   receiving second user input data that comprise parameters defining an acoustic nature of the direct environment of the current loudspeaker; and
   receiving third user input data that comprise information about the position of the current loudspeaker within the room, relative to the listening position.

9. A method as set forth in claim 8, further comprising:
   determining a level and determining a delay from the parameters defining the acoustic nature of the room, the information of the position of the current loudspeaker within the room relative to the listening position, and the parameters defining the acoustic nature of the direct environment of the current loudspeaker.

10. A method as set forth in claim 8, wherein the parameters of the acoustic nature of the room comprise an estimated classification concerning reverberativeness, wherein the classification has not more than ten levels.

11. A method as set forth in claim 6, wherein the parameters concerning the direct environment of the current loudspeaker comprise information about sound reflecting surfaces within a distance of one meter from the current loudspeaker.

12. A device for automatic configuration of an audio reproduction system for a loudspeaker arrangement of a plurality of loudspeakers by a computer, wherein the loudspeaker arrangement and the computer are located in a room and are connected to a network, wherein the configuration is carried out via the network, wherein the loudspeaker arrangement and the computer are located in the same room, and wherein the computer is configured to:
   automatically determine all loudspeakers connected to the network;
   detect a number of loudspeakers located in the room and belonging to the loudspeaker arrangement and a virtual loudspeaker arrangement according to the determined number, wherein each virtual loudspeaker of the virtual loudspeaker arrangement has an associated position;
   automatically generate a representation of the virtual loudspeaker arrangement on a graphical display of the computer; and
   wherein sequentially for each loudspeaker that belongs to the loudspeaker arrangement as a current loudspeaker the computer is configured to:
   cause the respective current loudspeaker to generate an acoustic and/or optical signal;
   receive a user input defining the virtual loudspeaker on the graphical display that is located at the position of the respective current loudspeaker; and
   assign the virtual loudspeaker position to the current loudspeaker;
   wherein the computer is adapted for receiving information data from the current loudspeaker concerning a loudspeaker type, and
   wherein the computer is further configured to:
   assign a characteristic information data of the current loudspeaker according to the loudspeaker type; and
   calculate a correction filter curve for the current loudspeaker from information about the position of the current loudspeaker in the room and from the characteristic information data of the current loudspeaker;
   wherein the calculated correction filter curve can be provided by the computer to a correction filter for the current loudspeaker; and
   wherein the calculated correction filter curve when being applied to the current loudspeaker calibrates the current loudspeaker;
   and wherein the step of calculating the correction filter comprises:
   calculating a first preliminary correction filter curve that compensates a reverberativeness of the room;
   calculating a second preliminary correction filter curve that compensates boundary effects, wherein the boundary effects are an acoustic interaction of the current loudspeaker with its direct environment;
   determining an environment-specific interpolation factor from the information about the position of the current loudspeaker relative to a listening position; and
   generating the correction filter curve by interpolating between the first preliminary correction filter curve and the second preliminary correction filter curve, using the determined interpolation factor, wherein the impact of the second preliminary correction filter curve increases as a listening position relative to the current loudspeaker decreases.

13. A device as set forth in claim 12, further comprising:
   a user interface for receiving first user input data comprising the number of loudspeakers located in the room and belonging to the loudspeaker arrangement and/or for receiving second user input data being a selection among a plurality of possibilities of loudspeaker arrangements with the determined number of loudspeakers in the room.

14. A device as set forth in claim 12, wherein the computer is configured to use geometric parameters of the room and parameters concerning a direct environment of the current loudspeaker for calculating the correction filter.

15. A device as set forth in claim 14, wherein the calculating the correction filter further comprises:
   determining a reverberativeness of the room based on the geometric parameters of the room and using the determined reverberativeness for calculating the first preliminary correction filter curve;
   using, for calculating the second preliminary correction filter curve, the characteristic information data of the current loudspeaker and the parameters concerning the direct environment of the current loudspeaker; and
   determining the environment-specific interpolation factor from the information about the position of the current loudspeaker relative to the listening position.

16. A device as set forth in claim 15, wherein the computer is adapted for receiving and storing user input data, comprising:

first user input data that comprise parameters defining an acoustic nature of the room, including the geometric parameters of the room;

second user input data that comprise parameters defining an acoustic nature of a direct environment of the current loudspeaker, including the parameters concerning the direct environment of the current loudspeaker; and third user input data that comprise information about the position of the current loudspeaker within the room, relative to the listening position.

17. A non-transitory storage medium having stored thereon computer-readable instructions that when executed on a computer cause the computer to execute a method as set forth in claim 1.

* * * * *